June 4, 1957     H. HUBER     2,794,936
SPACE-CHARGE WAVE TUBES

Filed Dec. 31, 1953     12 Sheets-Sheet 1

INVENTOR
HARRY HUBER,
BY Hamilton, Lake & Co.
ATTORNEYS

June 4, 1957    H. HUBER    2,794,936
SPACE-CHARGE WAVE TUBES
Filed Dec. 31, 1953    12 Sheets-Sheet 2

INVENTOR
HARRY HUBER,
BY Haseltine, Lake & Co.
ATTORNEYS

INVENTOR
HARRY HUBER,

June 4, 1957 H. HUBER 2,794,936
SPACE-CHARGE WAVE TUBES
Filed Dec. 31, 1953 12 Sheets-Sheet 4

INVENTOR
HARRY HUBER,
BY Haseltine, Lake & Co.
ATTORNEYS

June 4, 1957  H. HUBER  2,794,936
SPACE-CHARGE WAVE TUBES
Filed Dec. 31, 1953  12 Sheets-Sheet 5

INVENTOR
HARRY HUBER,
BY Haseltine, Lake & Co.
ATTORNEYS

June 4, 1957　　　　H. HUBER　　　　2,794,936
SPACE-CHARGE WAVE TUBES
Filed Dec. 31, 1953　　　　　　　12 Sheets-Sheet 6
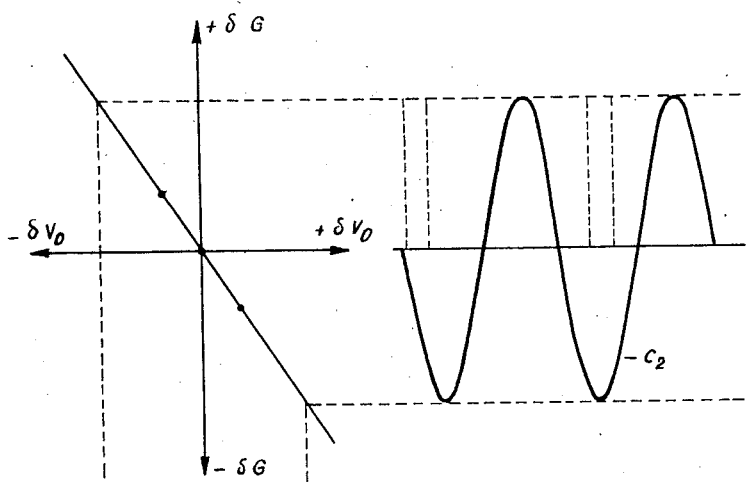
FIG. 11
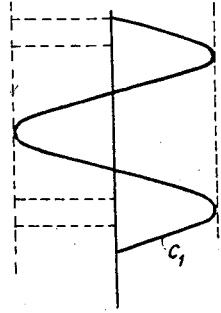
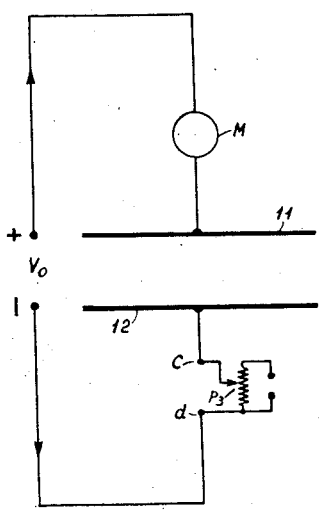
FIG. 12
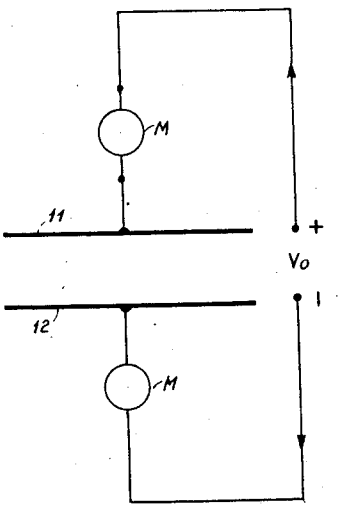
FIG. 13
INVENTOR
HARRY HUBER,
BY Haseltine, Lake & Co.
ATTORNEYS June 4, 1957  H. HUBER  2,794,936
SPACE-CHARGE WAVE TUBES
Filed Dec. 31, 1953  12 Sheets-Sheet 11

INVENTOR
HARRY HUBER,
BY Haseltine, Lake & Co.
ATTORNEYS

United States Patent Office 2,794,936
Patented June 4, 1957

2,794,936
SPACE-CHARGE WAVE TUBES

Harry Huber, Paris, France, assignor to Compagnie Generale de Telegraphie Sans Fil, a corporation of France Application December 31, 1953, Serial No. 401,662

16 Claims. (Cl. 315—3.6)

In a copending application Serial Number 144,502 filed on February 16, 1950, in the name of R. Warnecke, W. Kleen, H. Huber and O. Doehler for "Ultra-High Frequency Amplifier Tube" there is described a tube comprising an interaction space limited by two smooth parallel electrodes, and called "Diocotron space." In this space are propagated in a direction parallel to the surface of the two electrodes one or several electron beams. These beams are subject to the action of a constant magnetic field and of a constant electric field, the respective lines of force thereof being perpendicular to the mean direction of propagation of the electron beam and to each other. The electric field is created by applying to the two above electrodes fixed and different potentials.

It is known that, if at the input end of the interaction space there is fed an electromagnetic wave of ultra-high frequency, this wave produces in this or these beams an alternating current having the same period as the wave and which is progressively amplified from the input end to the output end of the interaction space.

The electron beam behaves as a fluid which is flowing through a passageway and is disturbed at a point, this disturbance resulting in a slowing down of the current streams situated near one of the edges of the passageway and an acceleration of the streams situated near the other edge. Thus, there is created a speed gradient in the direction perpendicular to that of the fluid flow, the mean speed of the current remaining constant. This disturbance is propagated and amplified along the current at the mean velocity of the latter and gives rise to waves having an amplitude that increases with the distance from the source of the disturbance. These waves are of the same nature as that which is the cause of the disturbance.

The tube described in the aforementioned patent application comprises an input circuit for feeding the ultra-high frequency wave to the tube, this circuit being situated near the emitting system, an interaction space and an output circuit enabling the amplified wave to be picked off.

The present invention has for its object to provide an improved tube bearing a resemblance to the aforementioned tube, as well as several of its possible applications.

According to the invention the tube is characterized in that means are provided for making the electric field, existing in the interaction space limited by two electrodes having smooth surfaces, independent of electric fields existing respectively in the input circuit and the output circuit. It is thereby possible to vary the electric field prevailing in the interaction space while keeping unaltered the electric fields existing in the input and output circuits. The magnetic field remains always constant throughout the whole tube.

According to a preferred embodiment, the tube according to the invention, which will be termed hereinafter a "Diocotron tube," comprises the following elements:

a. An evacuated envelope.

b. Means for creating inside this envelope a constant magnetic field.

c. An input circuit comprising: means for feeding to the tube an electromagnetic ultra-high frequency wave; a cathode for producing an electron beam and an electronic optical system of the type which it is conventional to use in travelling wave tubes operating with a magnetic field, for example that described in the copending application Serial No. 290,530 of May 28, 1952 (inventor D. Charles), now Patent No. 2,774,913, dated December 12, 1956.

d. A first interaction space limited by two electrodes parallel to each other and to the focussed electron beam, one of these electrodes being a delay line.

e. An amplifying circuit, or "Diocotron" space, defined by two smooth electrodes having smooth surfaces, the potential of one of these electrodes being high relative to that of the cathode.

f. An output circuit comprising essentially a beam collecting electrode having a high fixed potential and two electrodes similar to those of the input circuit.

g. A source of D. C. current for applying to these electrodes different fixed potentials, the positive electrodes having a high positive potential (for instance 1000 v.) relative to the cathode, the magnetic field being perpendicular both to the direction of propagation of the beam and to the electric field thereby created. Preferably the negative electrodes have a negative potential with respect to the cathode.

According to an important feature of the invention positive or negative electrodes are isolated from each other.

The tube according to the invention may be used in particular as an amplifier, an adjustable gain amplifier, a modulator, an automatic gain control device, an output power limiter, or as a frequency multiplier.

The invention will be better understood with the aid of the ensuing description with reference to the accompanying drawings in which:

Fig. 11 shows a curve relating to the operation of the tube according to the invention as a modulator;

Figs. 12 and 13 show diagrammatically two details of the tube according to the invention;

Fig. 17 shows diagrammatically the arrangement of the tube according to the invention when used as an adjustable level limiter;

Figure 1:
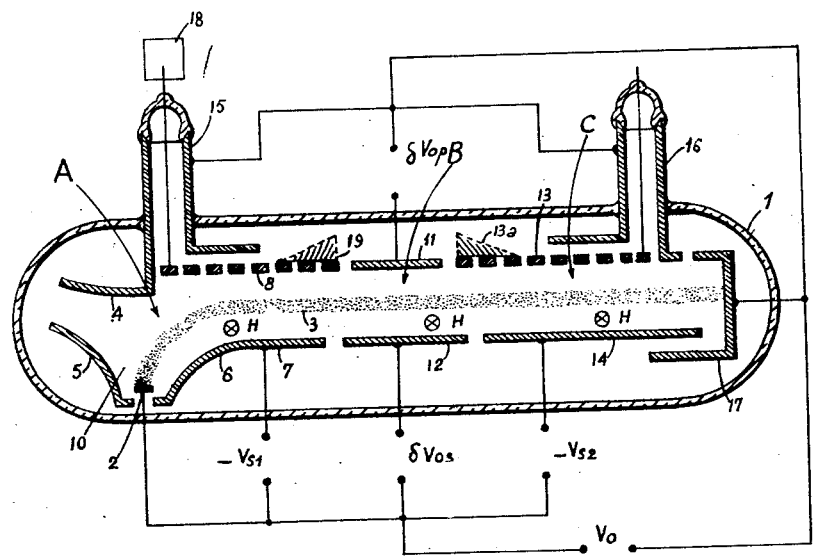
Fig. 1 shows diagrammatically the principle of the tube according to the invention.

The tube according to the embodiment shown in Fig. 1 comprises inside an evacuated envelope 1:

a. An input circuit A which comprises a cathode 2, the potential of which is taken as the origin of the potentials, for emitting a beam 3; an electronic optical system 10 for directing the beam 3, in the axial direction, this system being for example of the type described in the aforementioned copending application in the name of D. Charles, and comprising in particular an electrode 4 and an electrode 5; an electrode 6 prolonging the electrode 5, in electric contact with the latter (these two electrodes generally form an integral body) comprising a portion 7 parallel to a delay line 8 and having a potential $-V_s$, in order to keep the electrode 6 at a potential which is slightly negative with respect to the cathode, which is, as known, necessary for a good focussing of the beam 3.

A magnetic field, produced for example by a magnet 9 (Fig. 3), creates throughout the whole of the tube 1 a field H perpendicular to the plan of Fig. 1. The assembly formed by the electronic optical system 10 and the magnet 9 focusses the electrons into a beam 3, the mean direction of which is parallel to the surfaces of the electrodes between which it is propagated.

b. An amplifier circuit B which comprises two electrodes 11 and 12 which are flat, smooth and parallel and are respectively in the prolongation of the electrodes 7 and 8 but are electrically insulated from the latter. The electrode 12, which is in the prolongation of the electrode 7, is connected to an adjustable negative potential source and the electrode 11 is connected to an adjustable positive potential source. These two electrodes limit the interaction or "Diocotron" space.

c. An output circuit C which comprises a delay line 13, the input end of which supports an attenuation at 13a, and a parallel electrode 14 respectively in the prolongation of the electrodes 11 and 12. The electrode 14 has a potential $-V_{s2}$ for the same reason as the electrode 7 has a potential $-V_{s1}$ and the electrode 13 has the same potential $+V_0$ as the electrode 8.

The electrode 8 is coupled to a transmission line 15. The output end of the electrode 13 is coupled to a transmission line 16. A collector electrode 17 having the potential $V_0$ is placed at the terminal end of the tube.

As already stated the magnetic field H is perpendicular to the beam 3 and to the electric fields existing respectively between the electrodes 7—8, 11—12, 13—14.

There will now be described several modifications of the tube according to the invention with reference to the Figures 2 to 8. Like reference characters are used in Figs. 1 to 8 to denote like elements.

Figure 2:
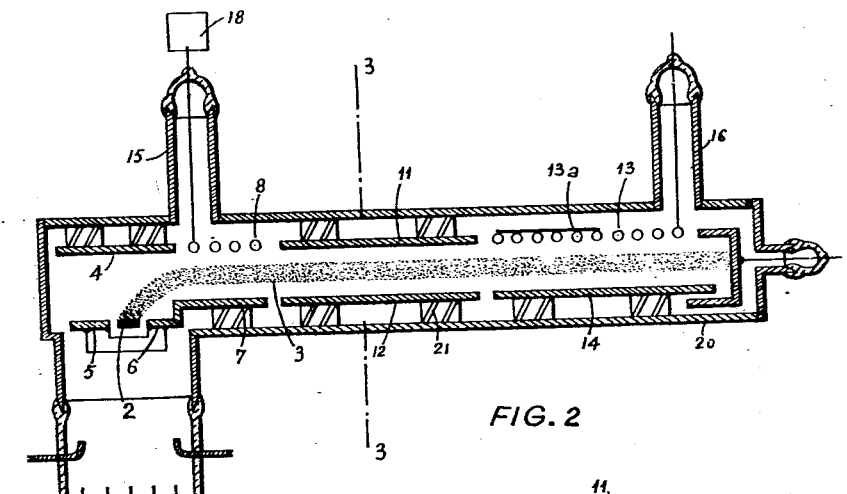
Fig. 2 shows diagrammatically a first embodiment of the tube according to the invention.

Fig. 2 shows in longitudinal section a tube having a metallic envelope 20 which is rectangular in transverse section. Inside this envelope, are supported by insulating supports 21 the various electrodes of the tube. A glass base 22 permits the connection of the electrodes to the various sources of potential (not shown in the drawing).

Figure 3:
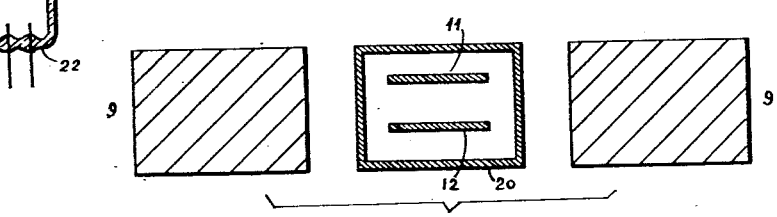
Fig. 3 shows partially a section along the line 3—3 of Fig. 2.

Fig. 3 shows the tube shown in Fig. 2 in section along the line 3—3.

In this figure there may be seen two polar elements 9 which create a magnetic field H perpendicular to the plane of Fig. 2.

Figure 4:
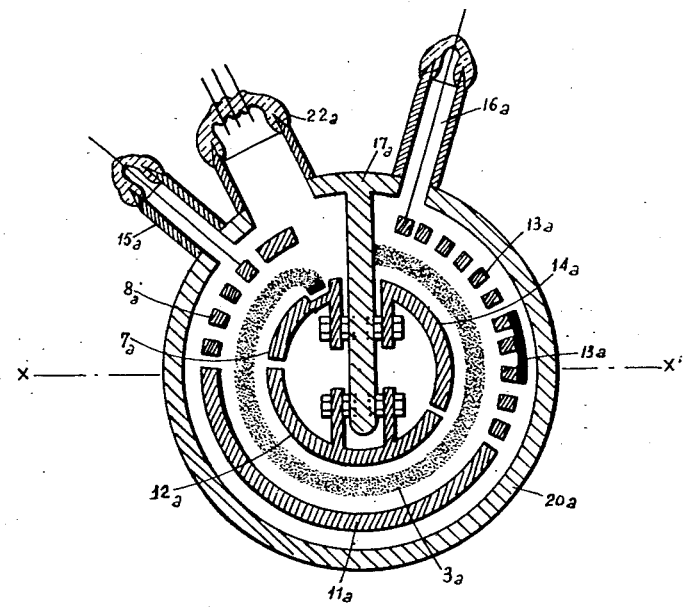
Fig. 4 shows diagramamtically a modification of the tube according to the invention.
Figure 5:
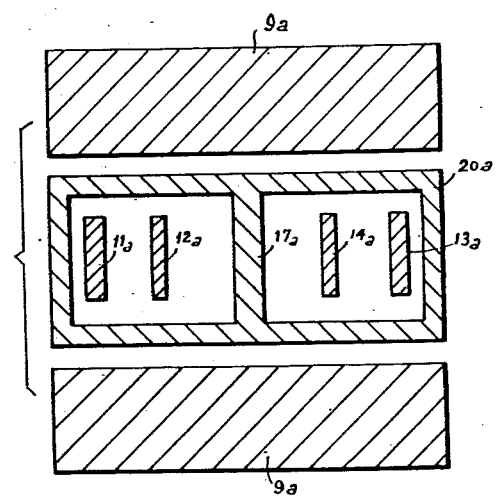
Fig. 5 shows a fragmentary axial section on line x—x of the tube according to the invention, shown in Fig. 4.

The tube shown in Fig. 4 has a cylindrical structure. The electrodes $8_a$, $11_a$, $13_a$ having a positive potential are disposed between the exterior wall of envelope $1_a$ and the beam $3_a$. The input $15_a$ and output $16_a$ are disposed on the periphery of the tube. The polar pieces $9_a$ (Fig. 5) are disposed on either side of the plane of Fig. 4.

Figure 6:
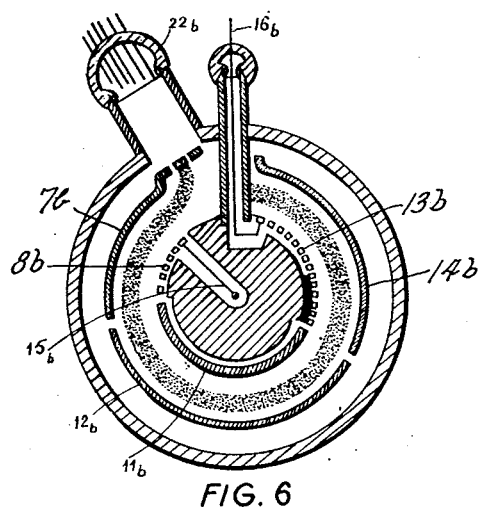
Fig. 6 shows diagrammatically another modification of the tube according to the invention.

Fig. 6 shows a tube similar to that shown in Fig. 4, but the positive electrodes $8_b$, $11_b$, $14_b$ are disposed in its central part. The input transmission line $15_b$ lies on the axis of the tube and the output line $16_b$ is directed in the radial direction.

Figure 7:
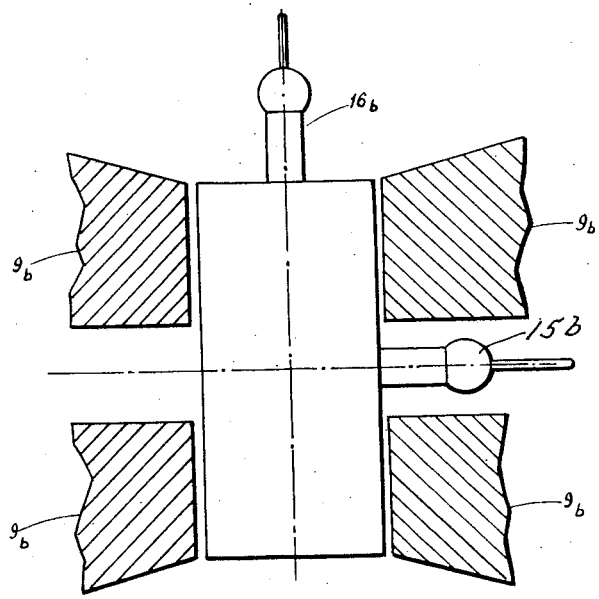
Fig. 7 shows a fragmentary axial section of the tube shown in Fig. 6.

Fig. 7 shows a lateral view of the tube shown in Fig. 6, the polar pieces $9_b$ having been apertured at their center to allow the passage of the input line $15_b$.

Figure 8:
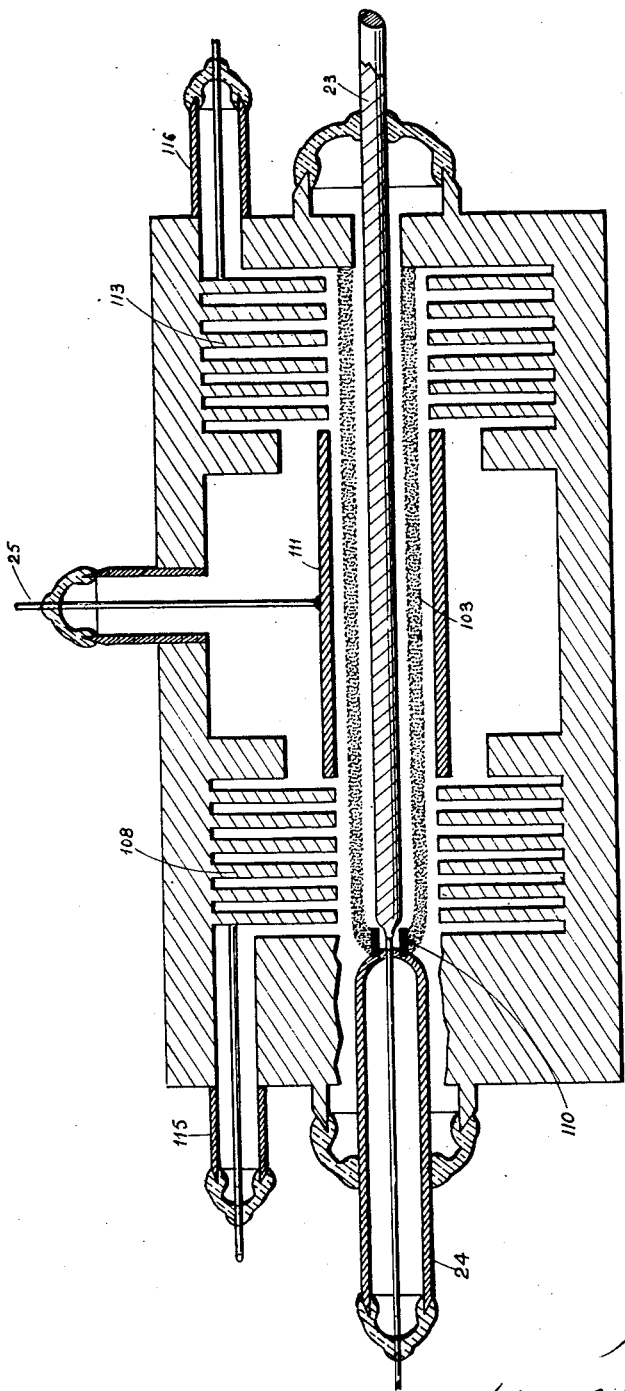
Fig. 8 shows diagrammatically another modification of the tube according to the invention in longitudinal section.

The tube shown in Fig. 8 is a cylinder of revolution and all the electrodes are constituted by pieces of revolution.

The negative potential electrodes are connected and form a single cylinder 23 which is coaxial with the tube. This electrode is biassed with the aid of a hollow cylindrical connection 24.

The positive potential electrodes surround the electrode 23. They form solids of revolution coaxial with the tube.

Electrodes 108 and 113 are formed by stacked disc type delay lines.

The electrode 111 is formed by a hollow tube biassed by means of a connection 25; it is electrically insulated from the electrodes 108 and 113. The input line 115 and the output line 116 are parallel to the axis of the tube. The electronic optical system 110 focusses the beam 103 so as to give it the form of a hollow tube which is propagated between the positive electrodes 108 and 113 and the negative electrode 23.

The magnetic field is produced by an intense continuous current flowing through the electrode 23.

Other modes of carrying out the invention are of course possible without departing from the scope of the invention.

*Operation*

A. *Amplification.*—To use the tube described above as an amplifier one proceeds in the following manner:

A source 18 is coupled to the tube (Fig. 1) which feeds to it an ultra-high frequency signal through the line 15. The high frequency energy is propagated along the delay line 8. The latter may either be terminated by an attenuated portion 19, in which case the waves propagated along the delay line 8 are damped or travelling waves, or may be without attenuation, in which case the waves are standing waves. The energy is collected after amplification in the space B on the line 16.

The applicant believes that the following may provide an explanation of the above operation, but he does of course not wish to be bound thereby as the construction and the utilization of the tube are not dependent upon such explanation.

Waves which will be called "space-charge waves" are induced in the beam 3 in the course of its passage through the input circuit A by modulation of this beam by the high frequency field which is progressive or stationary and which is fed through the medium of the line 15 by the source 18.

In the interaction space B the electromagnetic energy carried by the beam 3 is amplified. The beam then penetrates the output circuit C and induces in the line 13 an amplified wave. The amplification continues moreover from the input of the line 13 to its output in accordance with a mechanism comparable with that of magnetic field type travelling wave tubes. This wave is collected by the line 16.

Calculations made by the applicant and confirmed by experiments show that the gain obtained in the space B ("Diocotron" space) of the tube is a function of the field H, of the velocity of the electrons, of the distance between the electrodes 11 and 12, of their potential difference and of the intensity of the beam.

If $g$ is the gain per unit length of the tube obtained for a value $V_o$ of the potential difference between the electrodes 11 and 12, and $l$ the length of the space B, it is found that, if $V_o$ is varied by an amount $\delta V_o$ equal to $\delta V_{os} + \delta V_{op}$ (Fig. 1), there is obtained with a sufficient approximation a gain variation:

$$\delta g = -2gl \cdot \frac{\delta V_o}{V_o} = -2gl \cdot \frac{\delta V_{os} + \delta V_{op}}{V_o} \quad (1)$$

It is this property which gives the tube its great flexibility in use.

It is essential that at least one of the electrodes 11 and 12 be electrically insulated from the other electrodes of the tube for controlling the gain obtained by varying the electric field in the space B. This is true whatever the use of the tube according to the invention may be.

Figure 9:
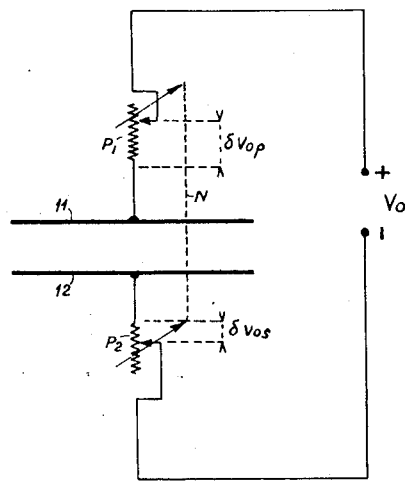
Fig. 9 shows diagrammatically a detail of the tube according to the invention.

B. *Controllable gain amplification.*—Equation 1 shows that the gain of the tube may be varied by varying the mean velocity of the beam in the "Diocotron" space. This speed results as is known from the equation $$v = \frac{E}{H}$$

where E is the electric field in this space and H the magnetic field. E is created by the potential difference between the electrodes 11 and 12. This potential difference may be adjusted as shown in Fig. 9.

According to this figure the electrodes 11 and 12 are connected respectively to the terminals of a high voltage source $V_o$ by two potentiometers $P_1$ and $P_2$. These two potentiometers permit variation of the potential of the electrode 12 between O and $\delta V_{os}$ and of the potential of the electrode 11 between $V_o$ and $V_o + \delta V_{op}$.

Figure 10:
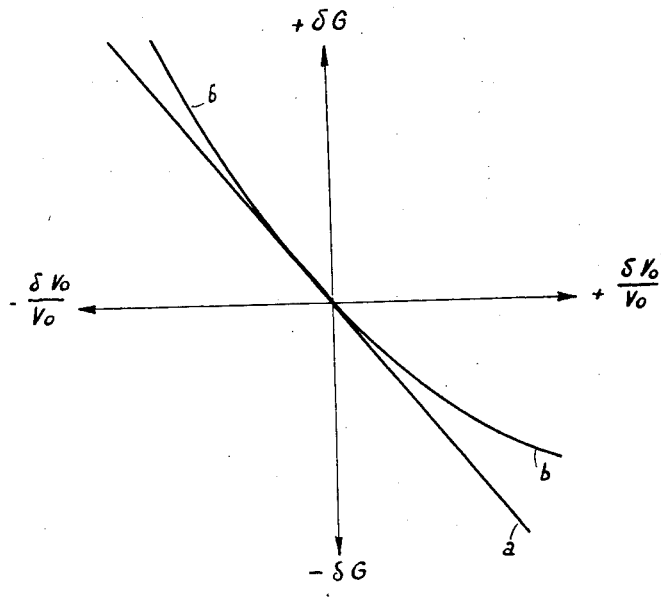
Fig. 10 shows a curve relating to the operation of the tube according to the invention as an amplifier.

Equation 1 shows that $\delta g$ is proportional, as a first approximation, to the relative variation of the potential difference between the electrodes 11 and 12. The variation $\delta g$ is positive when $\delta V_o$ is negative and vice versa, as is shown by the curve $a$ of Fig. 10 which shows the variations of $\delta g$ as a function of $$\frac{\delta V_o}{V_o}$$

If the beam approaches one or other of the electrodes 11 and 12, this variation follows the curve $b$.

The D. C. field in the "Diocotron" space, or space B, is not the same as that which exists in the input circuit A and the output circuit C. This results in a deviation of the trajectories of the electrons at the input and the output of the "Diocotron" space. In order to avoid that the electrons approach too close to one or the other of the electrodes 11 and 12 and are absorbed by the latter, it is preferable to vary simultaneously $\delta V_{op}$ and $\delta V_{os}$, while maintaining the ratio $$\frac{\delta V_{op}}{\delta V_{os}}$$

constant. To this end there may be provided a single control means for the potentiometers $P_1$ and $P_2$, diagrammatically shown at N. In this manner the variations in the gain are in accordance with the curve $a$ (Fig. 10) and are linear over a wide range.

It will be noted that this method of varying the gain is much more advantageous than the method of varying the current of the beam which is used for example in travelling wave tubes, since a beam intensity controlling electrode of the Wehnelt type, in the cathode stage, in general seriously disturbs the electron trajectories. Furthermore, the control of gain variations by varying the heating of the cathode can only give slow variations in gain, owing to the calorific inertia of the cathode.

C. *Modulation.*—It can be seen from Fig. 11 that if $\delta V_o$ varies in time in accordance with the curve $C_1$, the gain varies in the same manner in accordance with the curve $C_2$. Under these conditions the voltage $\delta V_o$ may be used for modulating the output voltage of the tube on condition that the curve $\delta G / \delta V_o$ is linear. The modulation voltage $\delta V_o$ may of course be of any form whatsoever, for example sinusoidal (curve $C_1$ in solid line), or in pulses (curve shown in dotted line).

Figs. 12 and 13 show diagrammatically two assemblies which permit the tube according to the invention to be used as a modulating tube.

According to Fig. 12 the modulating voltage is impressed on the electrode 11 in series with the biassing voltage $V_o$ by means of a source M of modulating voltage.

An adjustable D. C. voltage is applied to the electrode 12 through the medium of a potentiometer $P_3$.

By means of this voltage it is possible to choose the point of operation on the characteristic $\delta G / \delta V_o$ (this point corresponding to zero modulation voltage, i. e. to $\delta V_o = 0$). The connections may of course be reversed and the modulation voltage impressed upon the electrode 12.

The adjustment of the potentiometer $P_3$ results in adjustment of the electric field in the "Diocotron" space in such a manner as to reduce to a minimum the variation of the electron trajectories as in the preceding application (Fig. 9), this result being obtained when absorption of the beam is reduced to a minimum. At this moment the currents in the electrodes 11 and 12 are minimum.

There may of course be applied to the same electrode the modulation voltage and the biassing voltage, the latter being adjustable. Further, the modulation voltage may be impressed simultaneously upon the two electrodes 11 and 12, provided that the potentials of these electrodes are in phase. In this case the amplitudes of the two modulation voltages are adjusted so as to render the currents in the electrodes 11 and 12 minimum. In this case the amplitude of the modulation voltage is the sum of the amplitudes of the voltages applied respectively to the two electrodes 11 and 12.

If the modulation voltages impressed upon each of the two electrodes have the same amplitude but are out of phase by $\alpha$, the modulation voltage may be expressed:

$$\delta V_o = \sqrt{2} \cdot \delta V_{op} \cdot \sqrt{1 + \cos \alpha} \cdot \cos \left[ \omega t + \sqrt{\frac{1 + \cos \alpha}{2}} \right] \quad (2)$$

$\delta V_o$ is therefore a function of $\alpha$ when $\alpha = \pi$, $\delta V_o = 0$ and when $\alpha = 0$, $\delta V_o = 2 \cdot \delta V_{op} \cdot \cos(\omega t + 1)$.

Thus the gain of the tube is a function of the phase difference between the voltages applied respectively to the electrodes 11 and 12. In this case the tube according to the invention may be used as a phase discriminator.

Figure 14:
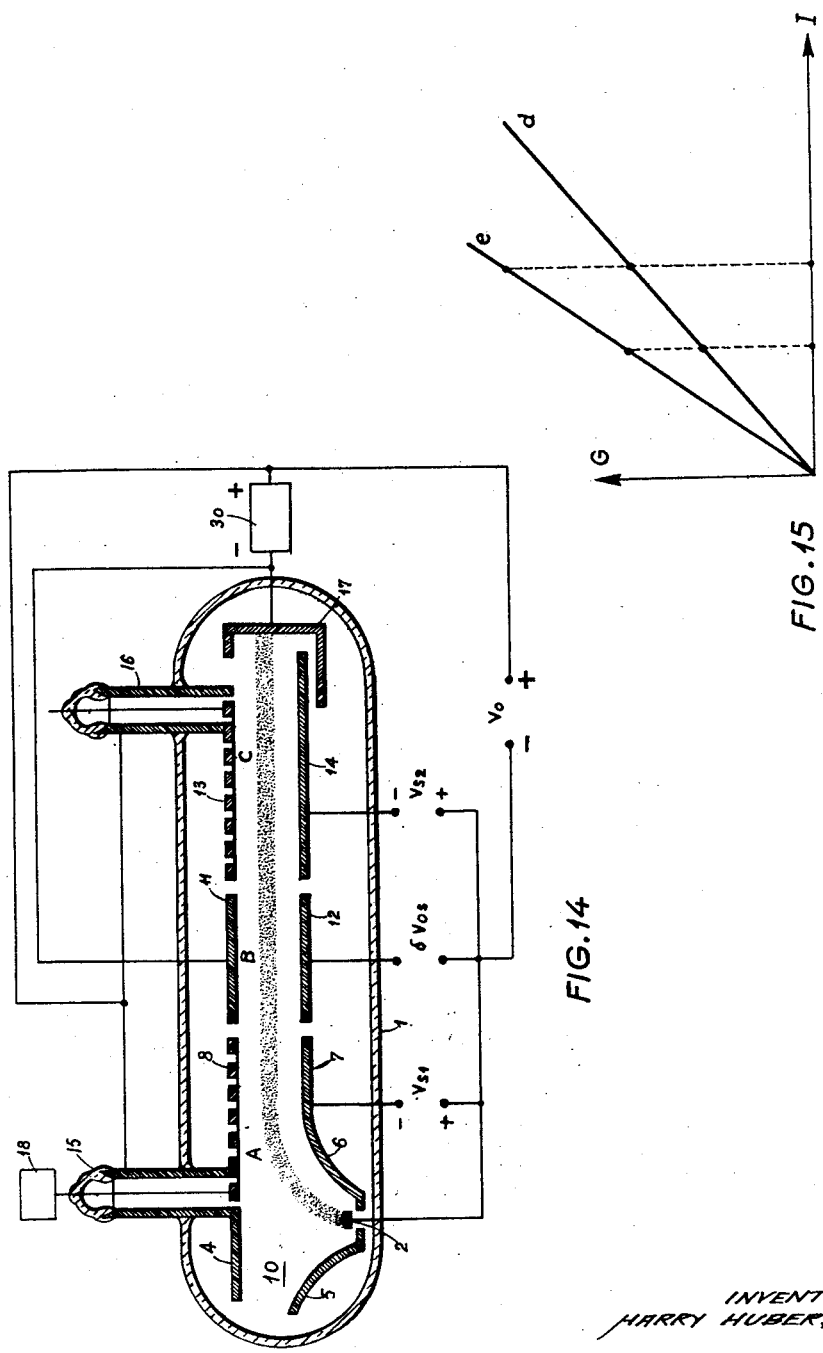
Fig. 14 shows the assembly of the tube according to the invention for use in the automatic gain control.

D. *Automatic gain control.*—Fig. 14 shows the tube shown in Fig. 1 provided with a device which makes it possible to control the slope of the gain characteristic as a function of the electron beam current. Like reference characters refer to like elements in both figures.

The voltage $V_o$ is applied to the collector 17 and to the electrode 11 through a resistor 30.

This resistor has the effect of lowering the potential of the electrode 11 by an amount $\delta V_{op}$ when the current delivered by the collector 17 increases, in other words when the current of the beam 3 increases. Thus the gain increases in accordance with Formula 1.

Figure 15:
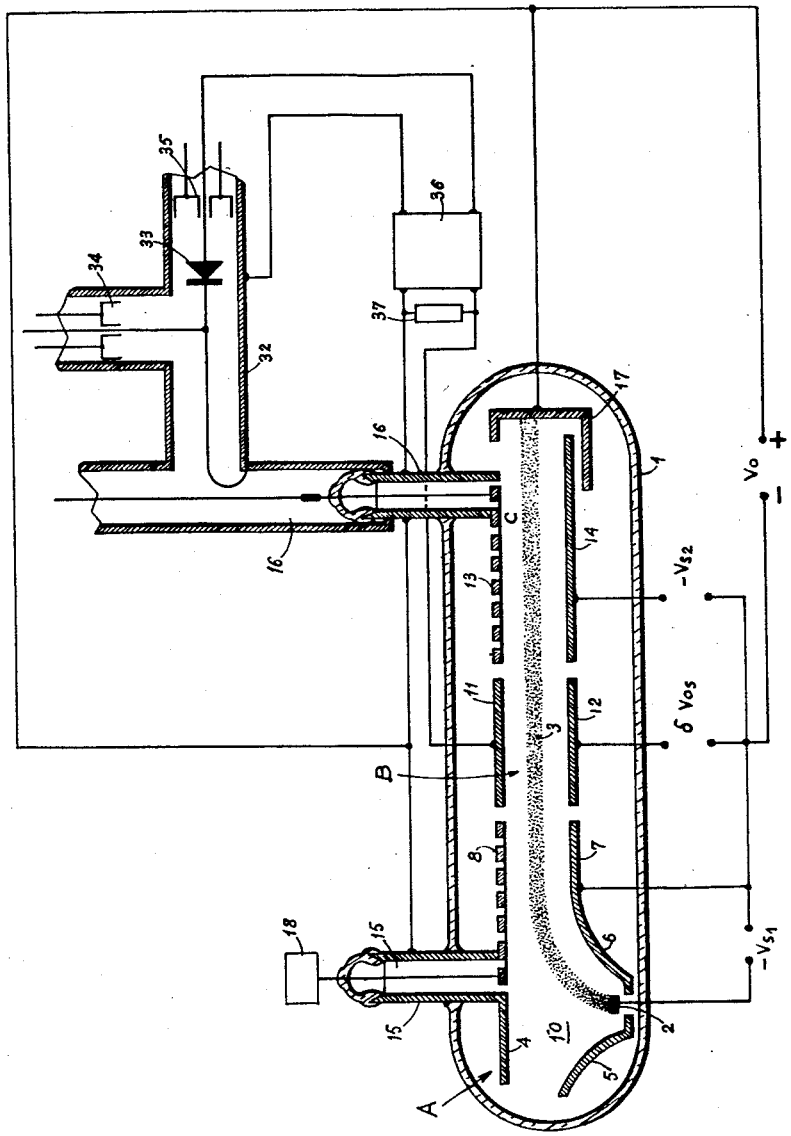
Fig. 15 shows a curve relating to the operation of the tube shown in Fig. 14.

Fig. 15 shows the gain variation as a function of the beam current. The curve $d$ is that which is obtained without the resistor 30. The curve $e$ is that which is obtained after this resistor has been added.

Figure 16:
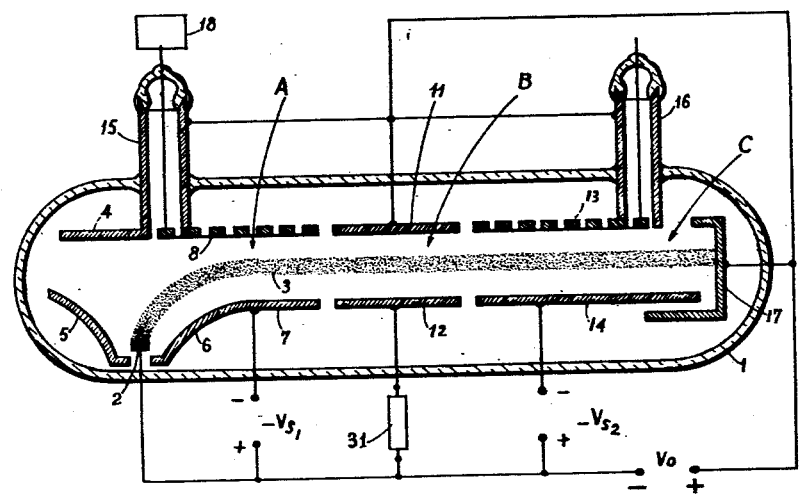
Fig. 16 shows diagrammatically the arrangement of the tube according to the invention when used as a limiter.
Figure 18:
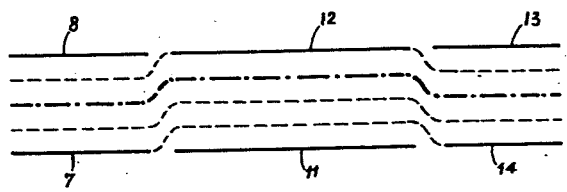
Fig. 18 shows diagrammatically the electron beam of the tube shown in Fig. 17.

Fig. 16 shows diagrammatically an assembly by means of which the output power may be maintained at a fixed level, whatever the level of the signals injected at the input of the tube may be.

In this assembly the electrode 12 is connected to the high-voltage source through a resistor 31.

The voltage drop across the resistor 31, caused by the current resulting from the impact on the electrode 12 of the electrons of the beam 3, lowers the potential of this electrode.

This potential drop $-\delta V_{os}$ results in an increase of the potential difference between the electrodes 11 and 12, which decreases the gain according to Formula 1.

Now, if the level of the input signal increases, the amount of electrons impinging on the electrode 12 increases for a given potential difference between the electrodes 11 and 12. Therefore, if it is desired that a decrease in the input signal amplitude have no effect on the output signal it is necessary that an increase of the current of the beam 3 causes the potential of the electrode 12 to be lowered.

Thus there is obtained a simple assembly permitting the output power to be stabilized despite fluctuations in the input power.

Fig. 17 shows an assembly by means of which it is possible to maintain the output power at a fixed value despite fluctuations in the various parameters which govern it.

In this figure there is shown a transmission line 32 coupled to the output line 16. A detector 33 is inserted in the line 32. Its input impedance is matched to the line 32 by devices such as pistons 34 of known type. The output voltage of this detector is fed to the input of an amplifier 36. One of the output terminals of this amplifier is connected to the positive pole of the source $V_o$ and the other terminal is connected to the electrode 11. A resistor 37 is connected across the output terminals of the amplifier 36.

This device operates in the following manner:

The high frequency power taken from the line 32 is detected by the detector 33 and is amplified by the amplifier 36. A potential difference appears across the terminals of the resistor 37. Hence, when the high frequency power increases at the output end of the tube, the potential of the electrode 11 becomes more positive, since the current in the resistor 37 increases. The electric field between the electrodes 11 and 12 increases and the gain decreases. By carefully choosing the value of the resistor 37 the fluctuations in the high frequency energy at the output may be eliminated.

This assembly may for example eliminate the consequences of fluctuations in the electron flow due to the effect of scintillation of the emitting cathodes.

The fluctuations in the input power due to the fading effect may also be compensated.

E. *Adjustable level power limitation.*—If $\delta V_{os} \gtrless \delta V_{op} > 0$, the beam 3, which as is known, follows the equipotentials in the absence of signals, approaches the electrode 11. If $\delta V_{os} = \delta V_{op}$, the beam retains its mean velocity. If $\delta V_{os} > \delta V_{op}$, this velocity increases.

Now, a signal has for effect to modulate in thickness the electron beam 3. The depth of modulation is an increasing function of the intensity of the signal. This modulation is propagated along the beam at the velocity of the latter.

A signal of a given intensity will therefore have for effect to cause a number of electrons to be captured by the positive electrode 11 which is the greater as the distance from the electron beam 3 to the plate is smaller, when there is no signal.

For a given distance, the quantity of electrons captured by the electrode 11, when there is a signal, is therefore an increasing function of the intensity of this signal.

Now it can be shown that the ultra-high frequency power collected at the output of the tube is an increasing function of the beam current in the output space, that is of the current collected by the collector 17.

The tube according to the invention may thus serve as a limiter tube, since the desired limit of the output power is adjustable by varying the D. C. voltage applied between the electrodes 11 and 12.

Figure 19:
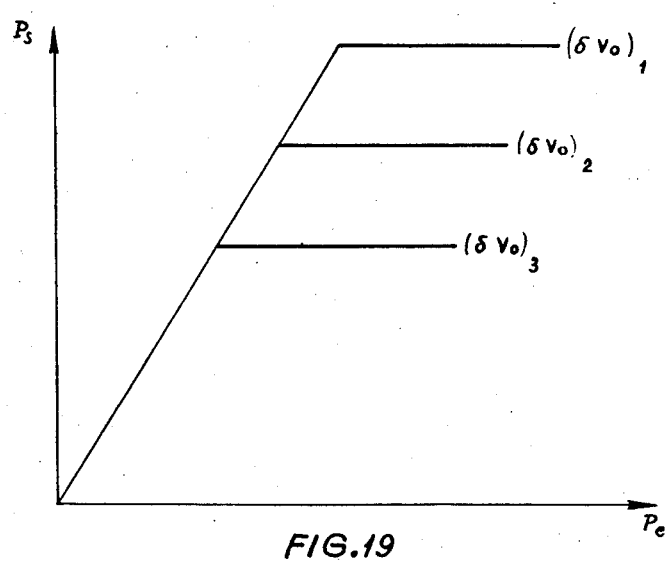
Fig. 19 shows a curve relating to the operation of the tube shown in Fig. 17.

Fig. 19 shows diagrammatically the appearance of the output power $P_s$ as a function of the input power $P_e$, and the limiting effect, the variation in the voltage $\delta V_o = \delta V_{os} + \delta V_{op}$ has on the power $P_s$.

F. *Frequency transposition with amplification.*—The tube according to the invention may also be used as a frequency-transposer. In other words, if there is fed to the tube an ultra-high frequency voltage having a frequency $F_1$ and a modulation voltage having a frequency $F_2$, a voltage resulting from the modulation of the first by the second frequency may be collected.

Figure 20:
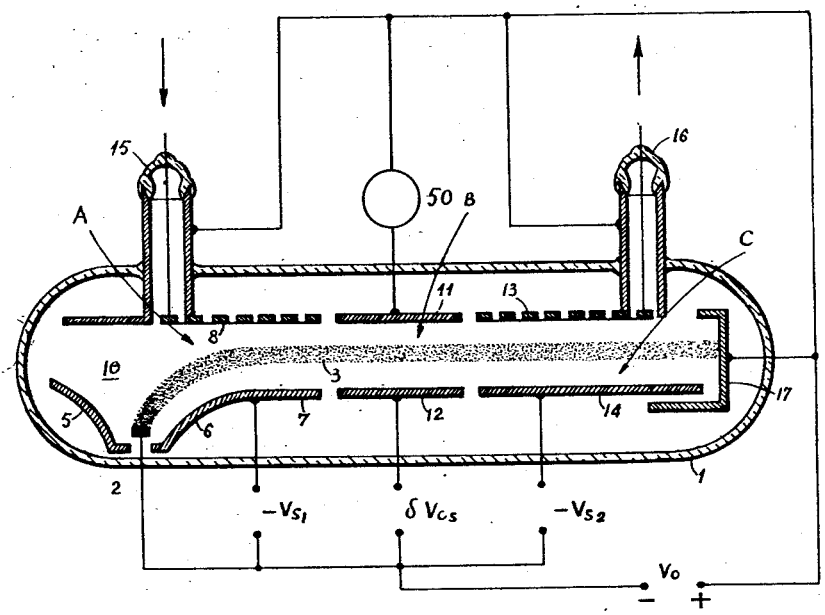
Fig. 20 shows diagrammatically the tube according to the invention assembled for use as a frequency shifter.

Fig. 20 shows a digram of the tube according to the invention used as a frequency transposed. An ultra-high frequency wave having a frequency $F_1$ is fed to the line 15.

The electrode 11 is biassed by the high voltage source $V_o$ in series with a local oscillator 50 providing an alternating voltage of frequency $F_2$. It is assumed that $F_2$ is very small compared with $F_1$.

In the line 16 there is collected a wave whose frequency $F_1 \pm F_2$ is in the neighborhood of $F_1$. In the "Diocotron" space of the tube the signal of frequency $F_1$ is modulated by the wave of frequency $F_2$.

This kind of assembly is advantageous where it is desired slightly to displace or transpose the frequency of an ultra-high frequency wave, for example in the case of Hertzian cable relay stations. In these stations there is generally received a wave of frequency $F_1$ and a wave of frequency $F_3 = F_1 \pm F_2$, which is not very different from the frequency $F_1$, is emitted.

Inasmuch as the frequencies $F_3$ and $F_1$ are similar, identical delay lines may be used at the input and output ends of the tube.

The mean velocities of the beam may be given different values at the input and output ends of the tube by means of voltages $V_{s1}$ and $V_{s2}$. The beam is then propagated at the input end of the tube with a velocity corresponding to the phase velocity of the wave of frequency $F_1$ along the delay line 8, and at the output end it is propagated with a velocity corresponding to that of the wave of frequency $F_1 - F_2$ along the delay line 13, the difference between these velocities being realtively small. The tube has therefore the property of automatically selecting at the output the frequency $F_1 - F_2$, to the exclusion of the frequency $F_1 + F_2$.

By way of example, if the incident frequency $F_1 = 3,000$ mc./s. is mixed with the frequency $F_2 = 100$ mc./s. of the local oscillator 50, the frequency at the output is $F_3 = F_1 - F_2 = 2,900$ mc./s. This example has been taken from the Paris-Lille Hertzian cable.

Figure 21:
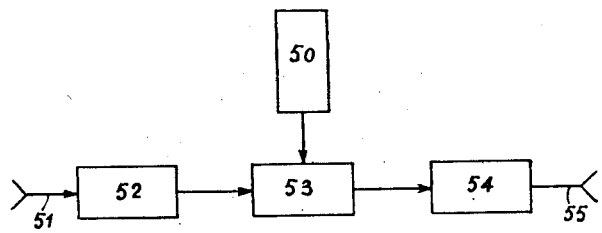
Fig. 21 shows a block diagram of a Hertzian cable relay station equipped with a tube such as that shown in Fig. 20.

Fig. 21 shows diagrammatically a Hertzian cable relay station equipped with the tube according to the invention.

A wave of frequency $F_1 \pm \Delta F$ ($\Delta F$ being half the band width) is received by an antenna 51.

This wave passes then through a pre-amplifier 52 and through a tube according to the invention 53, such as that shown in Fig. 20.

The modulator tube 53 also receives the wave from the local oscillator 50 of frequency $F_2$, which is small compared with frequency $F_1$. There is obtained a wave of frequency $F_1 \pm \Delta F - F_2$ which is amplified by the amplifier 54 and fed to an emitting antenna 55.

The input power is of the order of a microwatt. The output power attains, by means of this very simple assembly, a value of the order of a watt.

The systems at present in use are much more complicated and troublesome.

G. *Frequency multiplication.*—The tube according to the invention (Figs. 22 and 23), when used as a frequency multiplier, comprises an input circuit and an output circuit having different delay characteristics.

Figure 22:
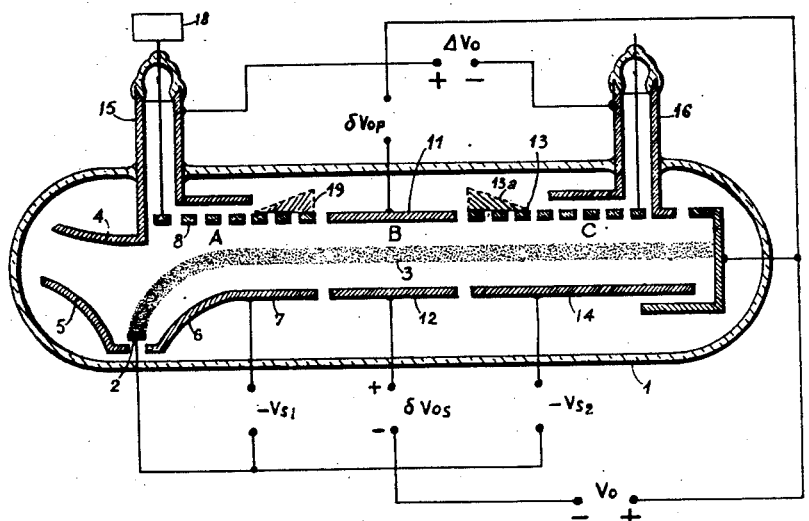
Figs. 22 and 23 show two embodiments of a tube according to the invention assembled for use as a frequency multiplier.
Figure 23:
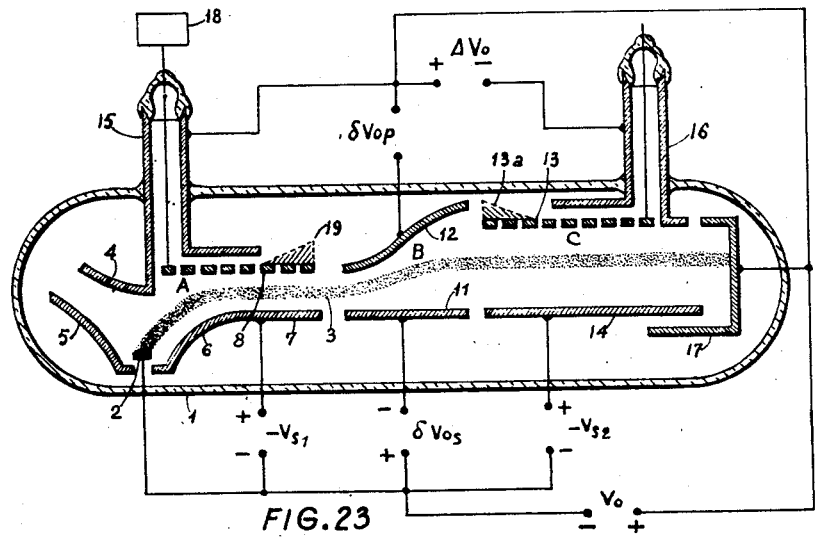

In the Figs. 22 and 23 like reference characters designate like elements illustrated in the preceding figures.

The delay line 8 has a delay rate $c/v$ ($v$=velocity of the delayed wave, $c$=velocity of light in free space) which gives to a wave of frequency $F_o$, fed to the line 8, a phase velocity along the axis of the tube which is substantially equal to the mean velocity of the electrons of the beam 3 in the input circuit A, namely $$\frac{E_e}{H}$$

where $E_e$ designates the electric field existing in this space.

In order to collect in the output circuit C the frequency harmonic $nF_o$ of the fed wave ($n$ being an integer), to the exclusion of other harmonics, the velocity of the electrons in the output circuit must be substantially equal to the phase velocity of the wave of frequency $nF_o$ on the line 13. It is obviously possible to select two delay lines which have the same delay rate, respectively for the frequency $F_o$ and for the frequency $nF_o$. In this case, to obtain the frequency multiplication, it suffices that the velocity of the electrons in the output space be the same as that in the input space. If $E_e$ is the electric field in the output space, it suffices that $Ee=Es$.

However, in the present state of the art concerned it it difficut to construct two delay lines having this property.

The tube according to the invention offers another way of solving this problem. Thus the two delay lines 8 and 13 having given delay rates for the wave of frequency $F_o$ and for the wave of frequency $nF_o$ respectively, the electron beam 3 is given in the input space A a velocity equal to the phase velocity of the wave $F_o$ on the line 8, and in the output space C a velocity equal to the phase velocity of the wave $nF_o$ on the delay line 13.

For this purpose (Fig. 23), the electric field is made different in the input and output spaces A and C, the magnetic field H remaining constant throughout the length of the tube. To obtain this, if it is desired for example to have a velocity which is less in the output space than in the input space, the distance between the electrodes 13 and 14 is increased, which makes $E_s < E_e$. In the input space A the velocity of the electrons is $$v_e = \frac{E_e}{H}$$

and in the output space C it is $$v_s = \frac{E_s}{H}$$

with $v_s < v_e$. This is the result which is generally desired in view of the fact that the delay rate of delay lines is generally an increasing function of the frequency. The transition from one velocity $v_e$ to the other $v_s$ is obtained by decreasing the velocity of the electrons in the 'Diocotron" space and may be obtained either by suitable adjustment of the voltages $\delta V_{op}$ and $\delta V_{os}$, or by gradually increasing the distance between the electrodes 11 and 12 from the input to the output (Fig. 23).

If the electrode 11 has the form shown, the beam retains more or less its thickness but does not remain, in the absence of the signal, on the same equipotential lines along the whole length of its travel. In the output space it is on slightly lower equipotential lines than in the input space. Hence, there is a risk that the beam will be at a too great distance from the delay line 13 in the output space. In order to maintain a correct coupling between the high frequency field and the beam in the output space C and thus eliminate this effect, it is necessary to decrease the potential of the delay line 13. To this end there is added in series in the biassing circuit of this line a source of adjustable continuous voltage $\Delta V_o$ in opposition to the source $V_o$.

The form of the electrode 11 is not critical. It is merely necessary to give to the transition space a sufficient length relative to that of the cycloid arcs along which the electrons travel inside the beam.

It should be noted, furthermore, that the gain in the "Diocotron" space B is high owing to the fact that the electrons are slowed down and $$\frac{\delta V}{V}$$

is progressively increased as shown by Formula 1.

What I claim is:

1. An ultra high frequency electronic discharge tube, of the type having, within an evacuated envelope, a cathode and an electronic optical system for emitting and focusing an electron beam, a collector for collecting the electrons of said beam and means for providing within said envelope an electric and a magnetic field perpendicular to each other and to the direction of said beam, comprising: an input and an output; a first electrode in the form of a delay line connected to said input; a second electrode having a smooth surface; and a third electrode in the form of a delay line connected to said output; said first, second and third electrodes being substantially in prolongation of each other; energized connections for bringing to high electric positive potentials said first, second and third electrodes with respect to said cathode; a fourth electrode; a fifth electrode having a smooth surface; a sixth electrode, said fourth, fifth and sixth electrodes being substantially in prolongation of each other; energized connections for bringing said fourth, fifth and sixth electrodes to potentials negative with respect to said cathode; at least one of said second and fifth electrodes being electrically isolated from the electrodes which are in prolongation thereof; said first and fourth, second and fifth, third and sixth electrodes being located in front of and spaced from each other for limiting respectively a first, a second and a third interaction space; said cathode being located for propagating said electron beam within said interaction spaces in their above order.

2. An ultra high frequency electronic discharge tube, of the type having, within an evacuated envelope, a cathode and an electronic optical system for emitting and focussing an electron beam, a collector for collecting the electrons of said beam, and means for providing within said envelope an electric and a magnetic field perpendicular to each other and to the direction of said beam, comprising: an input and an output; a first electrode in the form of a delay line connected to said input; a second electrode having a smooth surface; and a third electrode in the form of a delay line connected to said output; said first, second and third electrodes being substantially in prolongation of and electrically isolated from each other; energized connections for bringing to high electric positive potentials said first, second and third electrodes with respect to said cathode; a fourth electrode; a fifth electrode having a smooth surface; a sixth electrode; said fourth, fifth and sixth electrodes being substantially in prolongation of each other; energized connections for bringing said fourth, fifth and sixth electrodes to potentials negative with respect to said cathode; said first and fourth, second and fifth, third and sixth electrodes being located in front of and spaced from each other for limiting respectively a first, a second and a third interaction space; said cathode being located for propagating said electron beam within said interaction spaces in the above order.

3. A tube according to claim 1 wherein said electrodes are linear in shape.

4. A tube according to claim 1, said tube being of circular shape.

5. A tube according to claim 4, wherein said first, second and third electrodes are located nearer to the exterior wall of the tube than said fourth, fifth and sixth electrodes.

6. A tube according to claim 4, wherein said fourth, fifth and sixth electrodes are located nearer to the exterior wall of the tube than said first, second and third electrodes.

7. A tube according to claim 1, wherein said fourth, fifth and sixth electrodes are electrically isolated from each other.

8. A tube according to claim 1, wherein all said electrodes are bodies of revolution, said cathode being of the type emissive of a hollow cylindrical beam and said fourth, fifth and sixth electrodes constituting a single body having two terminals, energized connections to said two terminals, to create a constant difference of potentials between them, whereby an intense D. C. current flows across said body, and creates said magnetic field in said interaction spaces.

9. In combination: a tube according to claim 1, and voltage varying means inserted between said energized connections and at least one of said second and fifth electrodes for varying the difference of potential between said two electrodes.

10. In combination: a tube according to claim 1, and a modulating source, inserted between said energized connections and at least one of said second and fifth electrodes, for modulating the output of said tube.

11. In combination: a tube according to claim 1, and a resistor series connected between said energized connection and said second electrode and series connected between said collector and said energized connection, thereby automatically to control the amplification gain of the tube.

12. In combination: a tube according to claim 1, and a resistor series connected between said energized connection and said fifth electrode.

13. In combination: a tube according to claim 1, detecting means having output terminals parallel connected to said output of said tube, and a resistor, connected across said output terminals and series connected between said second electrode and said energized connection thereof.

14. In combination: a tube according to claim 1, and an oscillator connected to said second electrode.

15. In combination: a tube according to claim 1, means for feeding an ultra-high frequency signal to said input and an oscillator connected to said second electrode for providing a signal having a frequency very low with respect to said ultra-high frequency.

16. An ultra high frequency electronic discharge tube, of the type having within an evacuated envelope an electron gun having a cathode and an electronic optical system for emitting and focusing an electron beam, a collector for collecting the electrons of said beam, and means for providing within said envelope an electric and a magnetic field perpendicular to each other and to the direction of said beam, comprising: an input and an output; a first electrode in the form of a delay line having a predetermined delay rate for a predetermined ultra-high frequency connected to said input; a second electrode having a smooth surface; and a third electrode, in the form of a delay line having said predetermined delay rate for the $n$th harmonic of said ultra-high frequency, connected to said output; said first, second and third electrodes being substantially in prolongation of each other; energized connections for bringing to respective positive high electric potentials said first, second and third electrodes with respect to said cathode; a fourth electrode; a fifth electrode having a smooth surface; a sixth electrode; said fourth, fifth and sixth electrodes being in prolongation of each other; at least one of said second and fifth electrodes being electrically isolated from the electrodes in prolongation thereof; energized connections for bringing said fourth, fifth and sixth electrodes substantially to the same potential, said potential being negative with respect to said cathode; said first and fourth, second and fifth, third and sixth electrodes being located in front of and spaced from each other for limiting respectively a first, a second and a third interaction space; said cathode being located for propagating said electron beam within said interaction spaces in their above order.

References Cited in the file of this patent
UNITED STATES PATENTS

| | | |
|---|---|---|
| 2,414,121 | Pierce | Jan. 14, 1947 |
| 2,607,904 | Lerbs | Aug. 19, 1952 |
| 2,633,505 | Lerbs | Mar. 31, 1953 |